United States Patent [19]

Pipper et al.

[11] Patent Number: 5,068,308
[45] Date of Patent: Nov. 26, 1991

[54] CONTINUOUS PREPARATION OF AROMATIC POLYCONDENSATES

[75] Inventors: Gunter Pipper, Bad Durkheim; Gerhard Heinz, Weisenheim; Bernd Hisgen, Limburgerhof, all of Fed. Rep. of Germany

[73] Assignee: BASF Aktiengesellschaft, Ludwigshafen, Fed. Rep. of Germany

[21] Appl. No.: 365,130

[22] Filed: Jun. 12, 1989

[30] Foreign Application Priority Data

Jun. 15, 1988 [DE] Fed. Rep. of Germany ....... 3820361

[51] Int. Cl.$^5$ .................... C08G 69/28; C08G 63/668; C08G 63/688
[52] U.S. Cl. .................... 528/171; 528/176; 528/184; 528/288; 528/295; 528/295.5; 528/308
[58] Field of Search ................. 528/171, 176, 184, 65, 528/288, 295.5, 308, 295

[56] References Cited

U.S. PATENT DOCUMENTS

| | | | |
|---|---|---|---|
| 4,351,917 | 9/1982 | Calundann et al. | 528/184 |
| 4,537,949 | 8/1985 | Schmidt et al. | 526/65 |
| 4,727,131 | 2/1988 | Kock et al. | |
| 4,786,706 | 11/1988 | Kock et al. | 528/184 |
| 4,831,108 | 5/1989 | Richardson et al. | 526/65 |

FOREIGN PATENT DOCUMENTS 2933828  3/1981  Fed. Rep. of Germany ...... 528/184

*Primary Examiner*—John Kight, III
*Assistant Examiner*—Kathryne E. Shelborne
*Attorney, Agent, or Firm*—Keil & Weinkauf

[57] ABSTRACT

Aromatic polycondensates are prepared in a continuous process from
  a) aromatic hydroxy-, thio- and/or amino-carboxylic acids,
  b) aromatic dihydroxy-, dithio-, diamino- and/or hydroxy-amino compounds,
  c) urea as an optional component and
  d) a molar amount equivalent to the sum of components b) and c) of aromatic dicarboxylic acids, by
1. reacting components a), b), d) and optionally c) with lower fatty acid anhydrides in excess at from 140° to 280° C. with distillative removal of fatty acids and fatty acid anhydrides,
2. passing the oligomer mixture downward through a perpendicular precondensation zone to form a two-phase mixture of prepolymers and vaporous fatty acids,
3. separating the prepolymers from the vaporous fatty acids and
4. condensing the prepolymer in a condensation zone to give a granulable polycondensate.

8 Claims, No Drawings

CONTINUOUS PREPARATION OF AROMATIC POLYCONDENSATES

Aromatic polycondensates such as polyesters or polyester amides are prepared for example from terephthalic acid, hydroquinone, aminophenol, hydroxybenzoic acid and aminobenzoic acid by reacting the amino and hydroxyl groups present in the starting materials with acid anhydrides and then heating the products at up to 350° C. under reduced pressure to cleave off and distill off carboxylic acids. Such a process is described for example in EP-A-230,545. With the previously employed batchwise method of preparation it has proved very disadvantageous that mixing is difficult because of the high viscosity, the condensation takes several hours, and the polycondensates obtained are not always up to the required color quality standards.

It is an object of the present invention to provide a process for preparing aromatic polycondensates which is simple to carry out in a continuous manner, which takes only a short time, and which gives polycondensates of improved color quality.

We have found that this object is achieved by a process for preparing an aromatic polycondensate formed from a) an aromatic hydroxy-, thio- or amino-carboxylic acid where the hydroxyl, thio or amino group, which ever is the case, is not vicinal to the carboxyl group, b) an aromatic dihydroxy-, dithio-, diamino- or hydroxy-amino compound in which the hydroxyl, thio and amino groups are not vicinal to one another and which may be replaced to an extent of up to 30 mol % by an alkanediamine of from 4 to 10 carbon atoms or a cycloalkanediamine of from 5 to 8 carbon atoms, c) urea as an optional component and d) a molar amount equivalent to the sum of components b) and c) of an aromatic dicarboxylic acid in which the carboxyl groups are not in a vicinal arrangement and which may be replaced to an extent of up to 30 mol % by an alkanedicarboxylic acid of from 6 to 12 carbon atoms or a cycloalkanedicarboxylic acid of from 7 to 10 carbon atoms, comprising the following steps:

1) reacting components a), b), d) and optionally c) with a lower fatty acid anhydride in a molar excess, based on the hydroxyl, thio and amino groups, at from 150° to 280° C. with distillative removal of fatty acid formed and excess fatty acid anhydride to form an oligomer mixture, 2) passing the oligomer mixture from stage 1 downward through an essentially perpendicular tubular precondensation zone having a free surface area of from 0.3 to 1.5 m²/l with a residence time of from 3 to 30 minutes under a pressure of from 0.5 to 100 mbar at from 250° to 370° C. to form a two-phase mixture of prepolymer and vaporous fatty acid, 3) separating the prepolymer from the vaporous fatty acid and 4) condensing the prepolymer in a condensation zone in the course of a residence time of from 10 to 60 minutes at from 250° to 360° C. under a pressure of from 0.5 to 100 mbar to give a granulable polycondensate.

The novel process has the advantage that it makes it possible to prepare aromatic polycondensates continuously in a simple manner using a short residence time. Furthermore, the novel process has the advantage that polycondensates of improved color quality are obtained.

The starting materials a) are aromatic hydroxy-, thio- and/or amino-carboxylic acids where the hydroxyl, thio or amino group is not vicinal to the carboxyl group. Suitable compounds are for example 4-hydroxybenzoic acid, 3-hydroxybenzoic acid, 6-hydroxynaphthalene-2-carboxylic acid, 6-hydroxynaphthalene-1-carboxylic acid, 3-aminobenzoic acid, 4-aminobenzoic acid and the $C_1$–$C_4$-alkyl, $C_1$–$C_4$-alkoxy or halogen derivatives thereof, such as 3-methyl-4-hydroxybenzoic acid, 3,5-dimethyl-4-hydroxybenzoic acid, 2,5-dichloro-4-hydroxybenzoic acid, 4-mercaptobenzoic aid, 3-mercaptobenzoic acid, 6-mercaptonaphthalene-2-carboxylic acid, 4-aminobenzoic acid and 3-aminobenzoic acid.

Particular preference is given to 4-hydroxybenzoic acid, 3-hydroxybenzoic acid, 4-aminobenzoic acid and 3-aminobenzoic acid.

Starting materials b) are aromatic dihydroxy-, dithio-, diamino- or hydroxy- or thio-amino compounds in which the hydroxyl, thio and amino groups are not vicinal to one another and which may have been replaced to an extent of up to 30 mol % by alkanoldiamines of 4 to 10 carbon atoms and/or cycloalkanediamines of from 5 to 8 carbon atoms. Suitable compounds are for example hydroquinone, methylhydroquinone, phenylhydroquinone, tertbutylhydroquinone, chlorohydroquinone, 4,4'-dihydroxybiphenyl, 1,4-di(4-hydroxyphenyl)benzene, 1,2-di(4-hydroxyphenoxy)ethane, 4,4'-dihydroxydiphenyl ether, 4,4'dihydroxydiphenyl sulfone, 3,3'-dihydroxybiphenyl, 3,3'-dihydroxydiphenyl ether, 3,4'-dihydroxybiphenyl, 3,4'-dihydroxydiphenyl ether, 2,2-di(4-hydroxyphenyl)propane, 1,6-, 2,6- and 2,7-dihydroxynaphthalene, 3,3'-, 5,5,-tetramethyl-, 4,4'-dihydroxybiphenyl, 4,4'-di(p-hydroxyphenoxy)-diphenyl sulfone, 1,4-diaminobenzene, 1,3-diaminobenzene, 3-aminophenol, 4-aminophenol, and trans- and cis-1,4-cyclohexanediamine. Possible starting materials b) further include hydroxyl- and/or amino-functional oligomers, for example of polysulfones, polyether sulfones, polyether imides and polyaryl ether ketones.

Preference is given to using aromatic di-hydroxydiamino- and/or hydroxy-amino compounds.

Starting compound c), urea, is used if carbamide groups are to be present in the polycondensate in an amount of for example from 0.1 to 10 mol %.

Starting materials d) are aromatic dicarboxylic acids in which the carboxyl groups are not in a vicinal arrangement and which may have been replaced to an extent up to 30 mol % by alkanedicarboxylic acid of from 6 to 12 carbon atoms and/or cycloalkanedicarboxylic acid of from 7 to 10 carbon atoms, used in equivalent molar amounts, based on the sum of components b) and c). Preference is given to using aromatic dicarboxylic acids. Suitable compounds are for example terephthalic acid, isophthalic acid, 2,6-naphthalenedicarboxylic acid, 2,7-naphthalenedicarboxylic acid, 4,4'-dicarboxybiphenyl, 4,4''-dicarboxyterphenyl and dicarboxydiphenyl derivatives of the general formulae I, II and III:

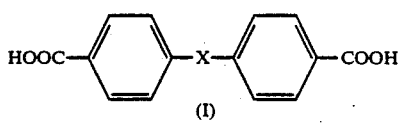

(I)

| -continued | |
|---|---|
| X = O | 4,4'-dicarboxydiphenyl ether |
| X = CH₂CH₂ | 1,2-di(4-carboxyphenyl)ethane |
| X = OCH₂CH₂O | 1,2-di(4-carboxyphenoxy)ethane |
| X = O(CH₂)₄O | 1,4-di(4-carboxyphenoxy)butane |

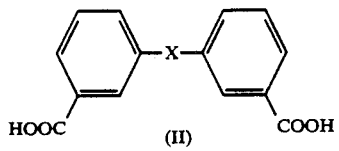

(II)

| X = O | 3,3'-dicarboxydiphenyl ether |
|---|---|
| X = CH₂CH₂ | 1,2-di(3-carboxyphenyl)ethane |
| X = OCH₂CH₂O | 1,2-di(3-carboxyphenoxy)ethane |
| X = O(CH₂)₄O | 1,4-di(3-carboxyphenoxy)butane |

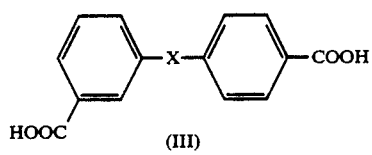

(III)

| X = O | 3,4'-dicarboxydiphenyl ether |
|---|---|
| X = CH₂CH₂ | 1,2-di(3,4'-dicarboxy)diphenylethane |
| X = OCH₂CH₂O | 1,2-di(3,4'-dicarboxy)diphenoxyethane |
| X = O(CH₂)₄O | 1,4-di(3,4'-dicarboxy)diphenoxybutane |

Further possibilities are dicarboxylic acids of the general formulae IV to VI

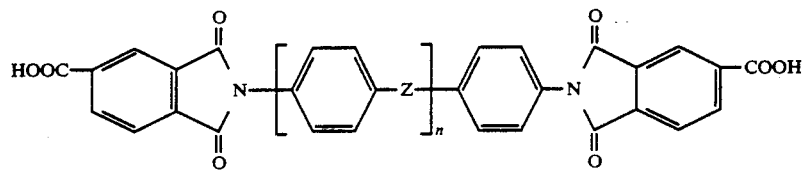

(IV)

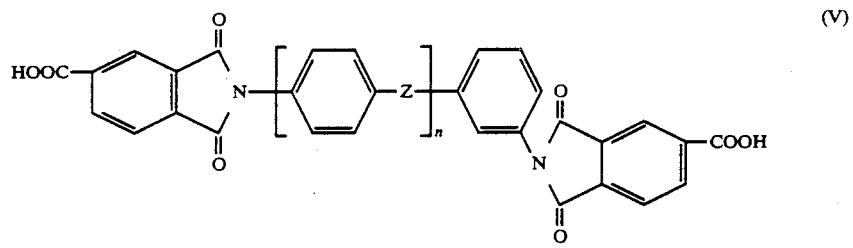

(V)

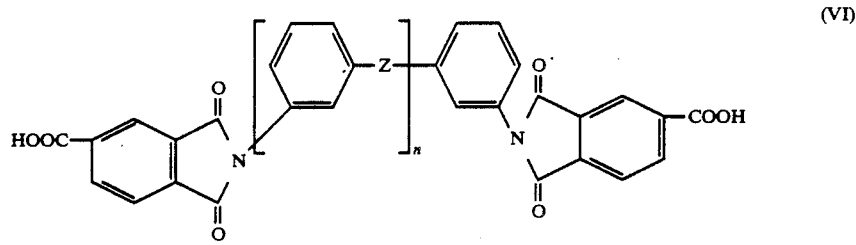

(VI)

where each indicated Z is —O—, —S—, —SO₂—, —CH₂—, —C(CH₃)₂— or a chemical bond, and n is 0 or 1.

Examples thereof are for

| Z = O | 4,4'- or 3,4'- or 3,3'-di(4-carboxy-N-phthalimido)diphenyl ether, for |
|---|---|
| Z = CH₂ | 4,4'- or 3,4'- or 3,3'-di(4-carboxy-N-phthalimido)diphenylmethane, for |
| Z = SO₂ | 4,4'- or 3,4'- or 3,3'-di(4-carboxy-N-phthalimido)diphenyl sulfone, for |
| Z = CO | 4,4'- or 3,4'- or 3,3'-di(4-carboxy-N-phthalimido)diphenyl ketone, and for |
| Z = S | 4,4'- or 3,4'- or 3,3'-di(4-carboxy-N-phthalimido)diphenyl sulfide, and for example for |
| Z = C(CH₃)₂ | 2,2-di[4,4'-di(4-carboxy-N-phthalimido)phenyl]propane. |

It is also possible to use p,p'-, m,m'- and p,m'-dicarboxyphenyl ketones of the general formulae VII to IX

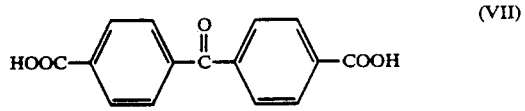

(VII)

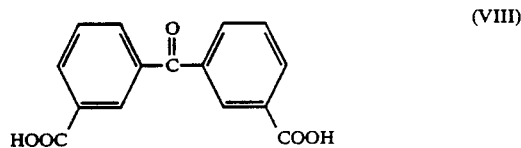

(VIII)

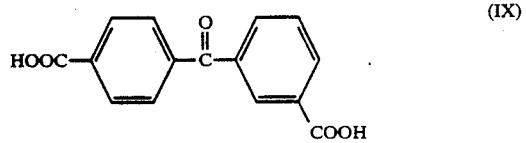

(IX)

The aforementioned carboxylic acids can also have substituents such as C₁-C₄-alkyl, C₁-C₄-alkoxy or halogen. Finally, there may also be mentioned aliphatic dicarboxylic acids such as cis- and trans-1,4-cyclohexanedicarboxylic acid and 1,3-cyclohexanedicarboxylic acid and the correspondingly substituted derivatives thereof.

Further suitable starting materials d) are dicarboxyl-functional oligomers, for example of polysulfones, polyether sulfones, polyether imides and polyaryl ether ketones.

Preference is given to using aromatic dicarboxylic acids.

In stage 1, components a), b), d) and optionally c) are reacted with lower fatty acid anhydrides in a molar excess based on the hydroxyl, thio and amino groups. Suitable fatty acid anhydrides are for example acetic anhydride, propionic anhydride and butyric anhydride, preferably acetic anhydride. It is advantageous to use the fatty acid anhydrides in an excess of from 5 to 60 mol %, based on the aforementioned groups. The reaction is carried out at from 140° to 280° C. with distillative removal of fatty acids formed and excess fatty acid anhydrides. In general, the temperature rises during the reaction from 140° C. to 280° C. at the rate at which fatty acids and fatty acid anhydrides are distilled off. It has proved to be advantageous t distill off the fatty acids and fatty acid anhydrides through a column, for example of from 2 to 10 plates, in order to avoid the entraining of starting compounds. The residence time is in general of from 2 to 4 hours. The result obtained here is an oligomer mixture which advantageously has an inherent viscosity of from 0.1 to 0.3. Advantageously, the reaction is carried out alternately, for example in two parallel-connected stirred kettles. Advantageously, the reaction is carried out in a plurality, for example from 2 to 4, consecutive kettles.

In a 2nd stage, the oligomer mixture from stage 1 is passed downward through an essentially perpendicular tubular precondensation zone. The precondensation zone advantageously has a diameter of from 2 to cm and a length:diameter ratio of from 300 to 50:1. It is maintained at a temperature of from 250° to 370° C., in particular of from 280° to 370° C. Furthermore, a residence time of from 3 to 30 minutes, in particular of from 5 to 20 minutes, and a pressure of from 0.5 to 100 mbar, in particular of from 5 to 50 mbar, are maintained. The specified pressure relates to the end part of the precondensation zone, since the starting mixture is introduced at the top of the precondensation zone under a higher pressure, for example at from 0.5 to 10 bar, and the pressure decreases to the aforementioned value in the course of the precondensation zone. Fatty acids evaporate during the precondensation to form a two-phase mixture of precondensate and vaporous fatty acids. It is of course the case that a plurality of tubular precondensation zones connected in parallel, for example as a tube bundle, are a convenient form of the apparatus for practice in industry.

To obtain thorough mixing of the two-phase mixture of precondensate and vaporous fatty acids, the precondensation zone has been provided with internal fitments. The internal fitments have a free surface area of from 0.3 to 1.5 m²/l, in particular of from 0.5 to 1.4 m²/l. Suitable internal fitments are for example packings such as Raschig rings or Pall rings. It has proved to be particularly advantageous for the internal fitments in the top third of the precondensation zone to have a free surface area of from 1.1 to 1.4 m²/l and in the remaining two-thirds a free surface area of from 0.5 to 0.8 m²/l.

The precondensate emerging from the precondensation zone has in general an inherent viscosity of from 0.2 to 0.5, in particular of from 0.25 to 0.45.

The two-phase mixture of vapors of fatty acids and precondensate emerging from the precondensation zone is separated in stage 3. In general, separation takes place automatically owing to the physical differences in a separator, the bottom part of which is advantageously constructed as a condensation zone. The evolved vapors, consist in the main of lower fatty acids derived from the lower fatty acid anhydrides used. The vapors are in general condensed and used elsewhere, after purification if necessary.

In stage 4, the precondensate obtained is condensed further, preferably in the separator at from 250° to 360° C., in particular from 270° to 350° C., under a pressure of from 0.5 to 100 mbar, in particular from 5 to 50 mbar, in the course of a residence time of from 10 to 60 minutes, in particular from 15 to 45 minutes, to give a granulable polycondensate. The polycondensate thus obtained has in general an inherent viscosity of from 0.3 to 1. It will be readily understood that the condensation temperature used is above the melting point of the particular polycondensate to be prepared.

To obtain high molecular weight polycondensates, a preferred procedure comprises passing the amorphous polycondensate thus obtained in the form of a liquid melt into a further condensation zone, for example an extruder with devolatilizing means, and condensing it there at from 220° to 380° C. under a pressure of for example from 100 to 1 mbar with constant formation of new surfaces until the desired viscosity is obtained.

In another preferred procedure, the condensation of partially crystalline polycondensates to high molecular weight polycondensates is carried out in the solid phase. The extruded and granulated polycondensate from stage 4 is condensed by means of hot inert gases such as nitrogen or carbon dioxide, in particular nitrogen, or under reduced pressure at from 10° to 80° C. below the melting point of the particular product to be condensed until the desired viscosity is obtained.

Customary additions such as delusterants, for example titanium dioxide, or stabilizers and additions of fibrous or particulate fillers, any further polymers, flame-proofing agents and the like are preferably mixed, for example in an extruder, into the polycondensate emerging from stage 4, and the granules obtained are then subjected to solid phase condensation.

The process according to the invention makes it possible, by a suitable combination of starting materials, to prepare polyesters, polyester amides, polyester imides, polyester carbonates, polyether esters, polyether ester amides, polyester amide imides, polyester carbamides and polyether ester imides.

The process according t the invention is particularly suitable for preparing thermotropically mesomorphic wholly aromatic polycondensates. The thermotropically mesomorphic properties are readily determinable by the method described in DE-A-2,520,819.

Examples of thermotropically mesomorphic polycondensates obtainable by the process according to the invention are for example 1. Thermotropically mesomorphic polyesters composed of 1a) from 10 to 25 mol % of repeat units of the formula

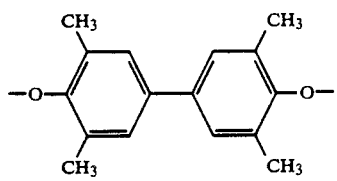

The starting material is advantageously 3,3',5,5'-tetramethyl-4,4'-dihydroxybiphenyl.

1b) from 5 to 15 mol % of repeat units of the formula

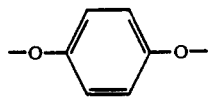

The preferred starting compound is hydroquinone.

1c) from 5 to 15 mol % of repeat units of the formula

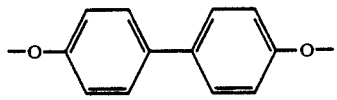

The starting compound is for example 4,4'-dihydroxybiphenyl.

1d) not less than 10 mol % of repeat units of the formula

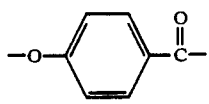

The preferred starting compound is 4-hydroxybenzoic acid.

1e) a molar amount corresponding to the sum of 1a), 1b) and 1c) of repeat units of the formula

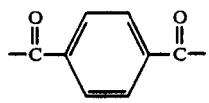

A suitable starting compound is, for example, terephthalic acid.

In preferred wholly aromatic polyesters of this type, some of units b) and/or c) have been replaced by 1f) repeat units of the formula

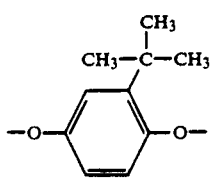

A suitable starting material here is for example tert.-butylhydroquinone and/or 1g) repeat units of the formula

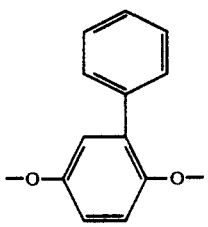

The preferred starting compound is phenylhydroquinone.

Advantageously, such wholly aromatic polyesters contain repeat units 1f) and 1g) in an amount of from 2 to 20 mol %. Furthermore, it has proved to be advantageous if the sum of the molar fractions of units 1a) and 1f) and/or 1g) is from 20 to 40 mol %.

In other preferred wholly aromatic polyesters, some of units 1b) and/or 1c) have been replaced by 1h) repeat units of the formula

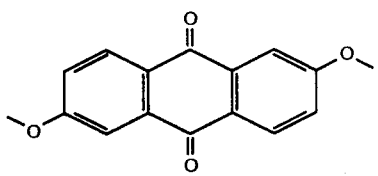

1i) repeat units of the formula

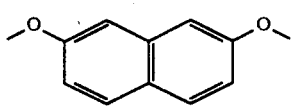

1j) repeat units of the formula

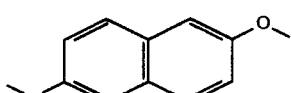

and/or
1k) repeat units of the formula

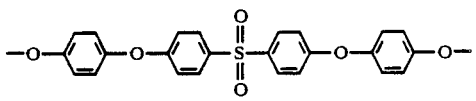

The starting material for component 1h) is 2,6-dihydroxyanthraquinone, for component 1i) 2,7-dihydroxynaphthalene, for component 1j) 2,6-dihydroxynaphthalene and for component 1k) 4,4,-di(p-hydroxyphenoxy)diphenyl sulfone.

It has proved useful if in the polyesters according to the invention the sum of the molar fractions of units 1a), 1h), 1i), 1j) and 1k) is from 20 to 40 mol %.

The dihydroxy compounds are advantageously used in each case together with an amount of terephthalic acid equivalent to their sum.

2. Thermotropically mesomorphic polyesters composed of 2a) from 5 to 35 mol % of repeat units of the formula

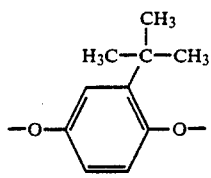

The starting compound used is t-butylhydroquinone.

2b) from 3 to 15 mol % of repeat units of the formula

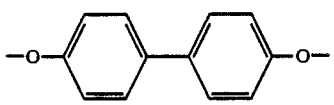

The starting compound used is 4,4,-dihydroxybiphenyl.

2c) a molar amount corresponding to the sums of 2a) and 2b) of repeat units of the formula

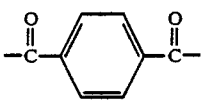

The starting compound used is terephthalic acid.

2d) not less than 10 mol % of repeat units of the formula

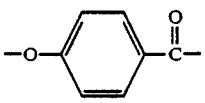

The starting compound used is p-hydroxybenzoic acid. In preferred polyesters of this type, some of the units b) have been replaced by 2e) repeat units of the formula

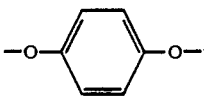

A suitable starting compound is hydroquinone, and/or 2f) repeat units of the formula

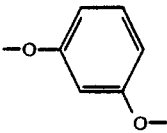

A suitable starting compound is resorcinol, and/or 2g) repeat units of the formula

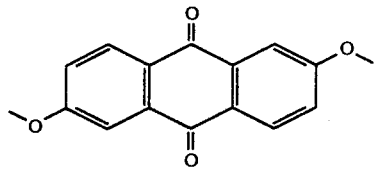

A suitable starting compound is 2,6-dihydroxyanthraquinone, and/or 2h) repeat units of the formula

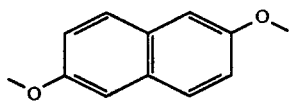

A suitable starting compound is 2,6-dihydroxynaphthalene.

In such polyesters, the units 2e), 2f) and/or 2g) are advantageously present in an amount of 5 to 12 mol %. Furthermore, it has proved to be advantageous if the molar fraction of units 2a) is from 15 to 25 mol %. In particularly advantageous polyesters, the molar fraction of the sum of 2a) and one or more units 2e), 2f) and 2g) is from 25 to 35 mol %.

It has proved to be advantageous if some of the units 2c) are replaced by units of the formula

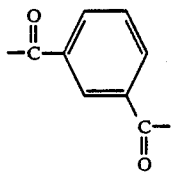

A suitable starting compound is isophthalic acid.

It is of course the case that the hydroxy compounds are advantageously used in each case together with an amount of terephthalic acid and/or isophthalic acid equivalent to their sum.

3. Thermotropically mesomorphic polyether esters composed of 3a) not less than 10 mol % of repeat units of the formula

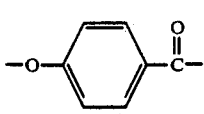

the starting material used is for example p-hydroxybenzoic acid, 3b) a molar amount corresponding to the sum of c) and d) of repeat units of the formula

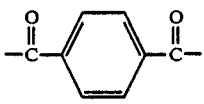

a preferred starting compound being terephthalic acid, 3c) from 5 to 20 mol % of repeat units of the formula

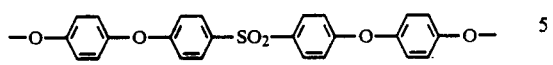

a starting compound being for example 4,4'-di(p-hydroxyphenoxy)diphenyl sulfone, and
3d) from 10 to 30 mol % of repeat units of the formula

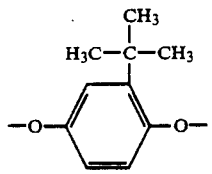

an advantageous starting compound being tert-butylhydroquinone.

Preferred polyether esters of this type contain as well as component 3a), from 10 to 15 mol % of component 3c), from 15 to 25 mol % of component 3d) and a molar amount of component 3b) equivalent to the sum of c) and 3d).

Some of the units 3d) may be replaced by
3e) repeat units of the formula

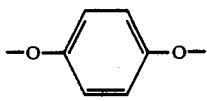

the starting compound used is for example hydroquinone, and/or
3f) repeat units of the formula

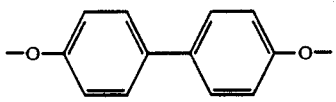

a suitable starting compound is 4,4'-dihydroxybiphenyl, and/or
3g) repeat units of the formula

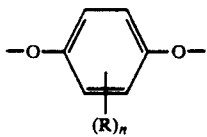

where R is separately methyl, phenyl or chlorine and n is 1, 2 or 3.

Suitable starting compounds are methylhydroquinone, trimethylhydroquinone, phenylhydroquinone and chlorohydroquinone.

Advantageously, such wholly aromatic polyether esters contain the repeat units 3e) and/or 3f) in an amount of from 5 to 10 mol %. In another preferred composition, the wholly aromatic polyether esters contain component 3g) in an amount of from 5 to 20 mol %.

4. Polyester carbamides composed of
4a) not less than 20 mol % of repeat units of the formula

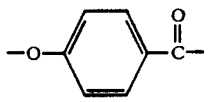

a suitable starting compound being for example p-hydroxybenzoic acid,
4b) from 5 to 15 mol % of repeat units of the formula

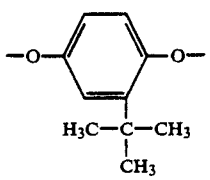

a suitable starting compound being for example t-butylhydroquinone,
4c) from 5 to 15 mol % of repeat units of the formula

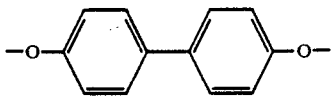

a suitable starting compound being for example 4,4'-dihydroxybiphenyl,
4d) from 1 to 10 mol % of repeat units of the formula

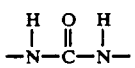

a preferred starting compound being urea,
4e) a molar amount corresponding to the sum of 4b), 4c) and 4d) of repeat units of the formula

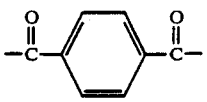

a suitable starting compound being for example terephthalic acid.

Some of the repeat units 4b) may be replaced by
4f) repeat units of the formula

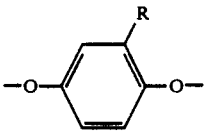

where R is $C_1$–$C_4$-alkyl (but not tert.-butyl), halogen or phenyl which may contain methyl groups as substituents.

Suitable starting compounds are for example methylhydroquinone, ethylhydroquinone, isopropylhydroquinone, chlorohydroquinone and phenylhydroquinone.

Advantageously, the level of repeat units 4f) is from 2 to 10 mol %.

It has further proved advantageous if in the polyester carbamides the molar proportion of the sum of components 4b) and 4d) is from 15 to 20 mol %.

In other polyester carbamides, some of component 4c) has been replaced by one or more repeat units of the formulae

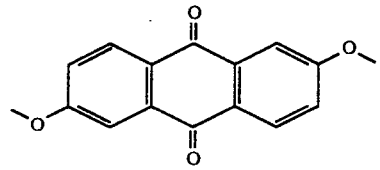

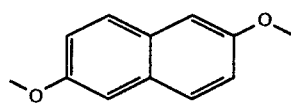

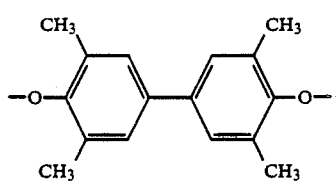

Suitable starting compounds for the repeat units of these formulae are 2,6-dihydroxyanthraquinone, 2,6-dihydroxynaphthalene and 3,3,-, 5,5,-tetramethyl-4,4,-dihydroxybiphenyl. Advantageously, the proportion of the repeat units of these formulae is in total from 2 to 10 mol %.

5. Polyesters composed of
5a) not less than 10 mol % of repeat units of the formula

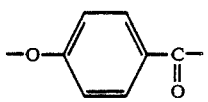

the starting compound used being 4-hydroxybenzoic acid, 5b) a molar amount equivalent to the sum of components c) and 5d) of repeat units of the formula

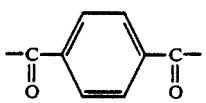

the starting compound used being advantageously terephthalic acid, 5c) from 3 to 20 mol % of repeat units of the formulae

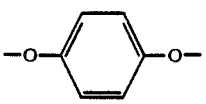

the starting compound used being for example hydroquinone,

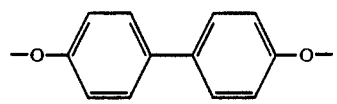

the starting compound used being for example 4,4'-dihydroxybiphenyl, 5d) from 5 to 30 mol % of repeat units of the formula

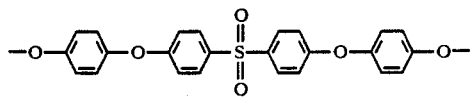

the starting compound used being advantageously 4,4'-di(p-hydroxyphenoxy)diphenyl sulfone.

Preferred polyether esters have been formed from not less than 20 mol %, advantageously up to 50 mol %, of component 5a), from 10 to 25 mol % of component 5d), from 5 to 15 mol % of component 5c) and an equimolar amount corresponding to the sum of 5c) and 5d) of component 5b). Advantageously, the polyether esters contain as component 5c) from 5 to 15 moles of repeat units derived from hydroquinone or a mixture of hydroquinone and dihydroxybiphenyl.

6. Polyester amides composed of
6a) from 5 to 35 mol % of repeat units of the formula

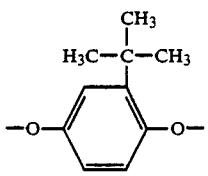

6b) from 5 to 15 mol % of repeat units of the formula

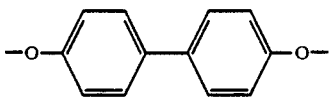

6c) a molar amount corresponding to the sum of components 6a) and 6b) and any 6e) of repeat units of the formula

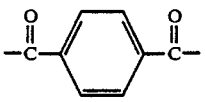

6d) not less than 10 mol % of repeat units of the formula

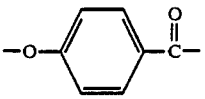

6e) from 2 to 15 mol % of repeat units of the formulae

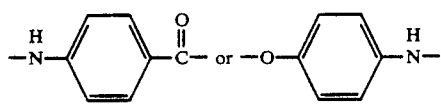

it being possible for the repeat units of the last formula to have been replaced in part by repeat units of the formula

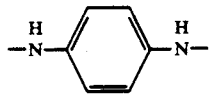

with the proviso that the sum of the molar fractions of components 6a), 6b), 6c), 6d) and 6e) is always 100 mol %.

Repeat units 6a) to 6e) are preferably derived from the following starting compounds:
6a) t-butylhydroquinone
6b) 4,4'-dihydroxybiphenyl
6c) terephthalic acid
6d) p-hydroxybenzoic acid
6e) p-aminobenzoic acid, p-aminophenol and 1,4-diamino benzene.

7. Polyester amides composed of
7a) from 3 to 30 mol % of repeat units of the formula

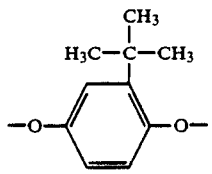

7b) from 3 to 30 mol % of repeat units of the formulae

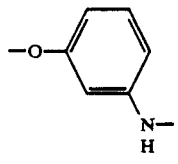

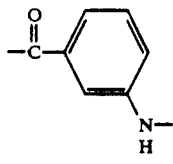

7c) from 2 to 25 mol % of one or more of the repeat units of the formulae

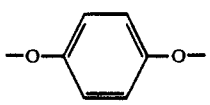

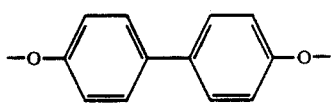

and

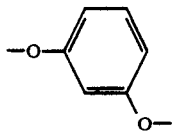

7d) a molar amount corresponding to the sum of components 7a), 7b) and 7c) (except the second repeat units of formula 7b)) of repeat units of the formula

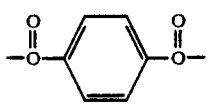

of which some may have been replaced by those of the formula

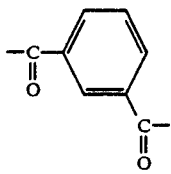

7e) an optional 5–25 mol % of repeat units of the formula

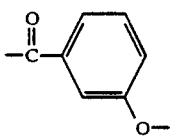

7f) repeat units of the formula

the molar fractions of components 7a) to 7f) always adding up to 100 mol %.
The units 7a) to 7f) are preferably derived from
7a): t-butylhydroquinone
7b): m-aminophenol or m-aminobenzoic acid
7c): hydroquinone, 4,4,-dihydroxybiphenyl or resorcinol
7d): terephthalic acid or isophthalic acid
7e): m-hydroxybenzoic acid and
7f): p-hydroxybenzoic acid.

Preferred polyester amides contain from 5 to 20 mol % of repeat units 7a), from 5 to 20 mol % of repeat units of the formula 7b) derived from n-aminophenol and from 5 to 20 mol % of the formula 7c), in particular those units 7c) derived from hydroquinone, and the corresponding amount of repeat units of the formula 7d and also repeat units 7f.

Other preferred polyester amides contain from 5 to 20 mol % of units 7a), from 5 to 20 mol % of units 7b) derived from m-aminobenzoic acid and from 5 to 20 mol % of repeat units 7c) derived from hydroquinone and 4,4'-dihydroxybiphenyl and those derived from m-aminophenol.

Further preferred polyester amides contain from 5 to 20 mol % of units 7a), from 5 to 20 mol % of units 7b) derived from m-aminobenzoic acid and from 5 to 20 mol % of units 7c) derived from hydroquinone and derived from n-aminophenol.

8. Polyester amides composed of
   8a) from 3 to 30 mol %, in particular from 5 to 25 mol %, of repeat units of the formula

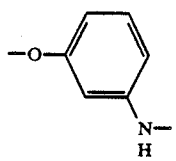

a suitable starting compound being m-aminophenol, 8b) from 3 to 25 mol %, preferably from 5 to 20 mol %, of one or more of the repeat units of the formulae

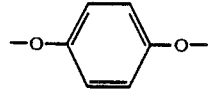

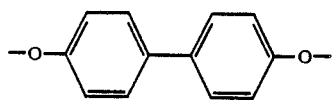

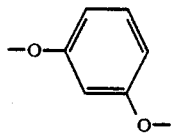

suitable starting compounds being for example hydroquinone, 4,4'-dihydroxybiphenyl and resorcinol. Particular preference is given to repeat units derived from hydroquinone or 4,4'-dihydroxybiphenyl or mixtures thereof.

8c) a molar amount corresponding to the sum of components 8a) and 8b) of repeat units of the formulae

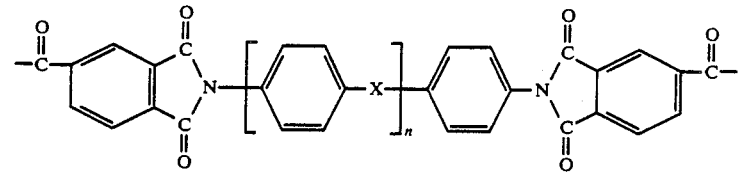

suitable starting compounds being for example terephthalic acid and isophthalic acid.

8d) repeat units derived from p-hydroxybenzoic acid, advantageously in an amount of not less than 10 mol %, in particular not less than 20 mol %, 8e) an optional 5-25 mol %, in particular 5-15 mol %, of repeat units of the formula

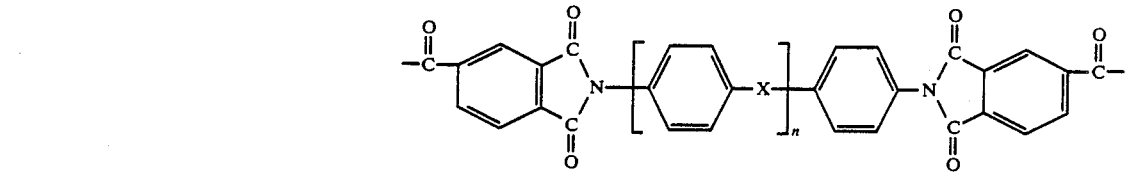

a suitable starting compound being for example m-hydroxybenzoic acid.

9. Polyester imides composed of
   9a) from 5 to 35 mol %, in particular from 7 to 31 mol %, of repeat units of the formulae

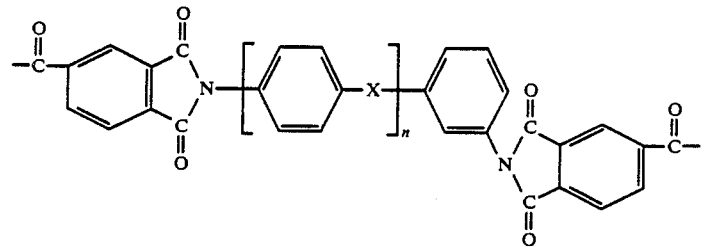

X and n can each be identical or different. X is —O—, —S—, —SO$_2$—, —CO—, —CH$_2$—, —C(CH$_3$)$_2$—, in particular —O—, —SO$_2$—, —CH$_2$—, and n is 0 or 1, in particular 1. Suitable starting compounds are for example 4,4'-di[(4-carboxy)-N-phthalimido]diphenyl ether 4,4'-di[(4-carboxy)-N-phthalimido]diphenylmethane 4,4'-di[(4-carboxy)-N-phthalimido]diphenyl sulfone 4,4'-di[(4-carboxy)-N-phthalimido]diphenyl sulfide 4,4'-di[(4-carboxy)-N-phthalimido]diphenyl ketone 3,4'-di[(4-carboxy)-N-phthalimido]diphenyl ether 3,4'-di[(4-carboxy)-N-phthalimido]diphenyl sulfide 3,4'-di[(4-carboxy)-N-phthalimido]diphenyl sulfone 3,4'-di[(4-carboxy)-N-phthalimido]diphenyl ketone 3,4'-di[(4-carboxy)-N-phthalimido]diphenylmethane, 9b) from 0 to 30 mol %, in particular from 0 to 20 mol %, of repeat units of the formula

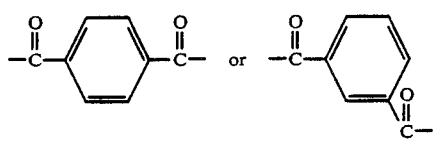

suitable starting compounds for these units being terephthalic acid and isophthalic acid, 9c) a molar amount corresponding to the sum of components 9a) and 9b) of one or more of the repeat units of the following formulae

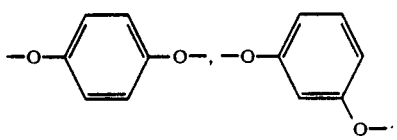

suitable starting compounds being for example hydroquinone, resorcinol, 4,4'-dihydroxybiphenyl and 2,7-dihydroxynaphthalene, 9d) not less than 10 mol %, in particular not less than 20 mol %, of repeat units of the formula

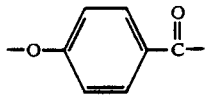

a suitable starting compound being for example p-hydroxybenzoic acid, 9e) an optional 5–25, in particular 10–20, mol % of repeat units of the formula

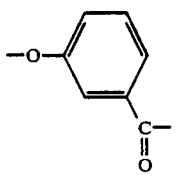

suitable starting compound being for example m-hydroxybenzoic acid.

Preferred polyester imides contain as component 9c) from 10 to 31 mol % of repeat units derived from hydroquinone and/or from 5 to 25 mol % of repeat units derived from the other starting compounds recited under 9c). Particularly preferred components 9c) are repeat units derived from hydroquinone, resorcinol and/or 4,4'dihydroxybiphenyl and mixtures thereof.

10. Polyester amide imides composed of 10a) from 5 to 35 mol %, in particular from 7 to 25 mol %, of repeat units of the formulae

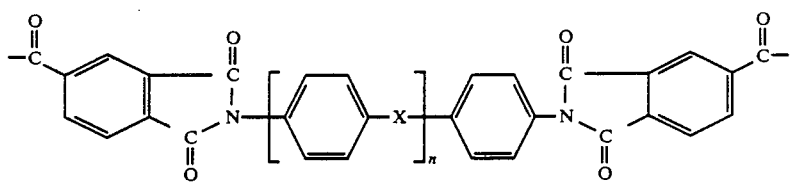

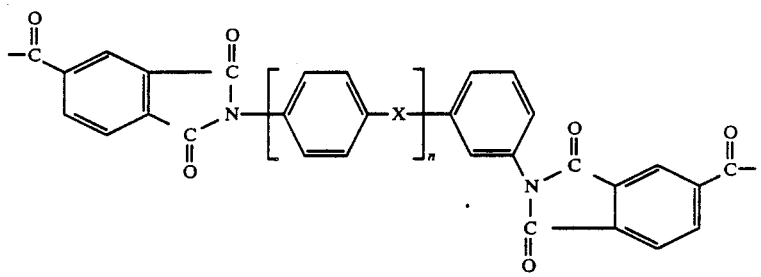

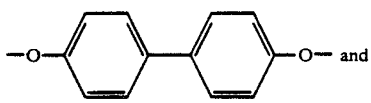

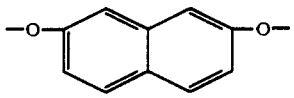

suitable starting compounds being the same as the compounds named above for units 9a) of polyester imides 9), 10b) from 0 to 30 mol %, in particular from 0 to 20 mol %, of repeat units of the formulae

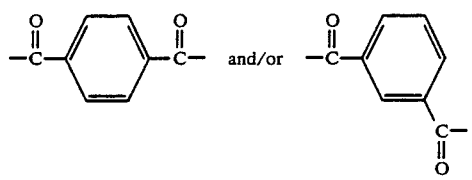 and/or

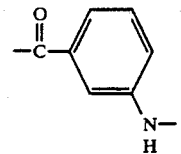

suitable starting compounds being for example terephthalic acid and isophthalic acid, 10c) a molar amount corresponding to the sum of components 10a) and 10b) of one or more of the repeat units of the following formulae

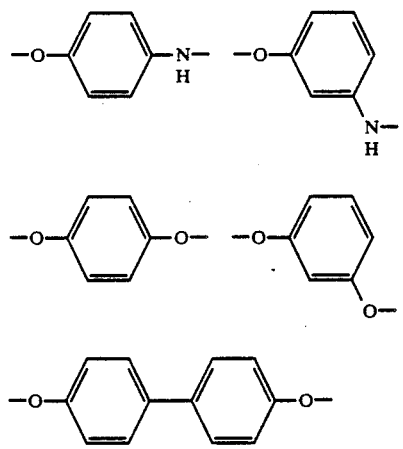

suitable starting compounds being p-aminophenol, m-aminophenol, hydroquinone, resorcinol and 4,4′-dihydroxybiphenyl.

10d) an optional 5–25 mol %, in particular 5–20 mol %, of one or more of the repeat units of the formulae

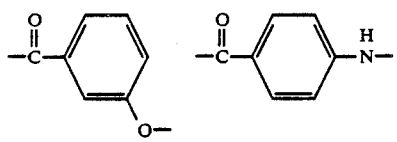

suitable starting compounds being m-hydroxybenzoic acid, p-aminobenzoic acid and m-aminobenzoic acid, 10e) repeat units, in particular in an amount of not less than 10 mol %, of the formula

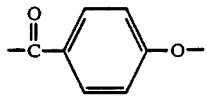

a suitable starting compound being p-hydroxybenzoic acid.

It is of course the case that the sum of the mole percentages of components 10a) to 10e) always adds up to 100 mol %.

Advantageously, the polyester amide imides according to the invention contain as component 10c) from 5 to 20 mol % of repeat units derived from m-aminophenol and/or from 2 to 8 mol % of repeat units derived from p-aminophenol and/or from 5 to 20 mol % of one or more of the repeat units derived from hydroquinone, resorcinol and 4,4′-dihydroxybiphenyl.

Particular preference is given to polyester amide imides which contain as component 10c) from 5 to 20 mol of repeat units derived from m-aminophenol and also from 5 to 15 mol % of repeat units derived from hydroquinone and an optional 5–15 mol % of repeat units derived from 4,4′-dihydroxybiphenyl.

11. Polyester imides composed of 11a) from 5 to 35 mol %, in particular from 7 to 25 mol %, of repeat units of the formulae

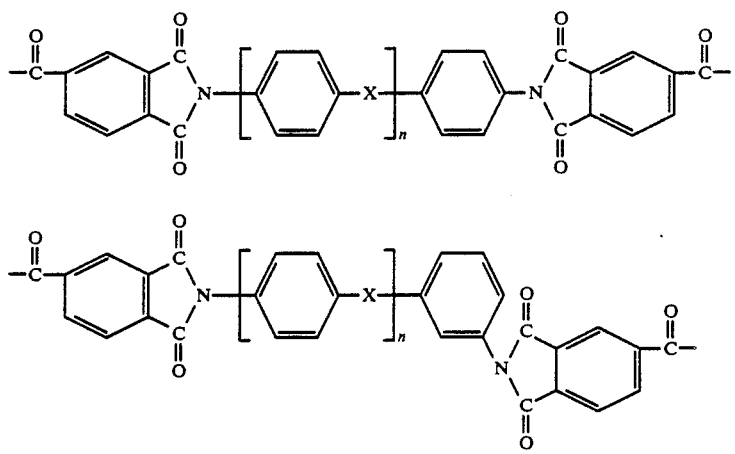

where X can be identical or different and separately is —O—, —S—, —SO$_2$—, —CO—, —CH$_2$— or —C(CH$_3$)$_2$ and n is 0 or 1; suitable starting compounds were given above in the context of units 9a) for polymers of type 9.

11b) from 0 to 30 mol %, in particular from 0 to 20 mol %, of repeat units of the formulae

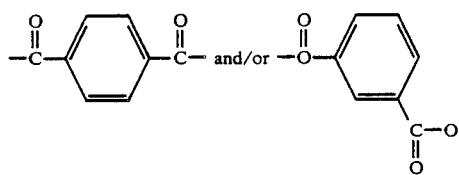 and/or 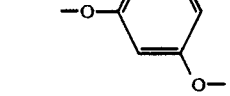

suitable starting compounds being terephthalic acid and isophthalic acid, 11c) a molar amount corresponding to the sum of components 11a) and 11b) of aromatic dihydroxy compounds, namely from 3 to 35 mol % of repeat units of the formula

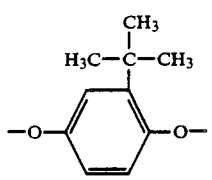

a suitable starting compound being tert.-butylhydroquinone, and one or more of the following repeat units in an amount of from 2 to 25 mol %:

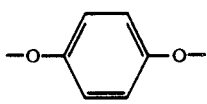

and

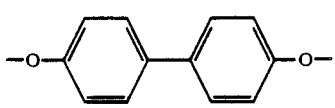

suitable starting compounds being hydroquinone and 4,4'-dihydroxybiphenyl, and from 0 t 25 mol % of repeat units of the formula a suitable starting compound being resorcinol.

11d) an optional 5-25 mol %, in particular 5-20 mol %, of repeat units of the formula

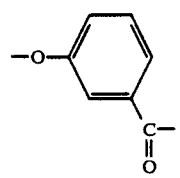

a suitable starting compound being for example m-hydroxybenzoic acid, 11d) repeat units of the following formula, advantageously in a minimum amount of 10 mol %:

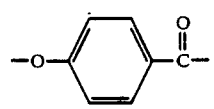

a suitable starting compound being p-hydroxybenzoic acid.

It is of course the case that the sum of the molar fractions of components 11a), 11b), 11c), 11d) and 11e) always adds up to 100 mol %.

Advantageous polyester imides contain as components 11c) from 5 to 25 mol % of repeat units derived from t-butylhydroquinone and from 5 to 20 mol % of one or more of the repeat units derived from hydroquinone, resorcinol or 4,4'-dihydroxybiphenyl.

12. Polyester amide imides composed of 12a) from 5 to 35 mol % of repeat units of the formula

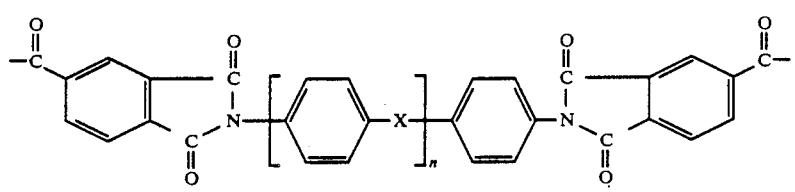

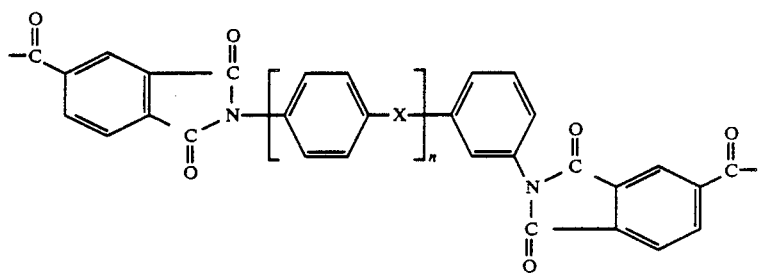

where X and n are each as defined above for units 9a) for polymers of type 9;

12b) from 0 to 30 mol % of repeat units derived from terephthalic acid and/or isophthalic acid, 12c) a molar amount corresponding to the sum of components 12a) and 12b) of one or more of the following repeat units:

12c1) from 3 to 35 mol % of units of the formula

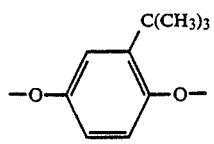

12c2) from 0 to 10 mol % of units of the formula

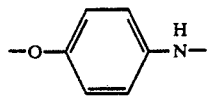

12c3) from 2 to 25 mol % of units of the formula

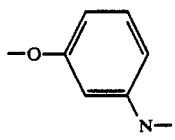

12c4) from 2 to 20 mol % of units of the formula

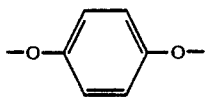

12c5) from 0 to 20 mol % of units of the formula

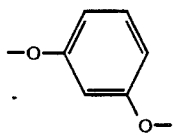

and

12c6) from 2 to 20 mol % of units of the formula

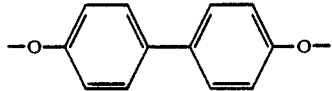

suitable starting compounds being t-butylhydroquinone, p-aminophenol, m-aminophenol, hydroquinone, resorcinol and 4,4'-dihydroxybiphenyl.

12d) not less than 10 mol % of repeat units of the formula

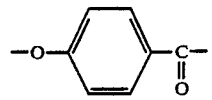

a suitable starting compound being p-hydroxybenzoic acid, and 12e) from 0 to 25 mol % of one or more of the repeat units of the formula

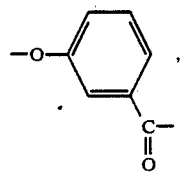,

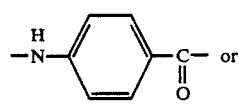 or

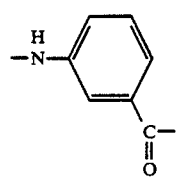

these units being derived from m-hydroxybenzoic acid, p-aminobenzoic acid and m-aminobenzoic acid.

13. Polyether ester imides composed of 13a) from 5 to 35 mol % of repeat units of the formula

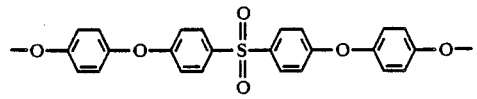

a suitable starting compound being 4,4'-di(p-hydroxyphenoxy)diphenyl sulfone, 13b) from 5 to 35 mol % of repeat units of the formulae

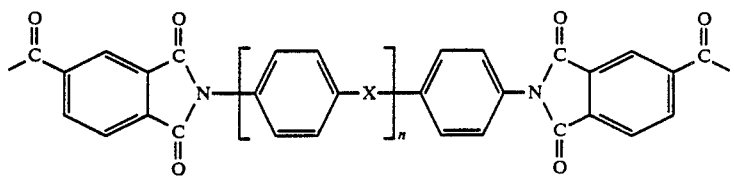

-continued

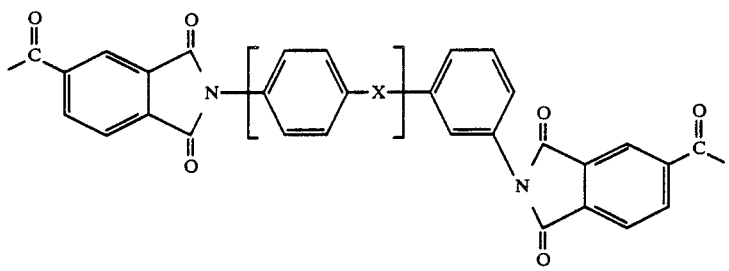

where X is a chemical bond, —O—, —S—, —SO₂—, —CO—, —CH₂— or =C(CH₃)₂ and n is 0 or 1. Suitable starting compounds were given above in the context of units 9a) for polymers of type 9.

13c) from 15 to 30 mol % of repeat units derived from terephthalic acid, 13d) a molar amount corresponding to the sum of components 13b) plus 13c) minus 13a) of repeat units of the formulae

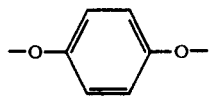

and/or

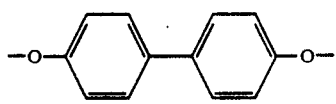

derived from hydroquinone and/or 4,4'-dihydroxybiphenyl, 13e) repeat units derived from p-hydroxybenzoic acid.

It is of course the case that the mole percentages of components 13a) to 13e) always add up to 100 mol %.

Preferred polyether ester imides are composed of from 10 to 30 mol % of repeat units 13a) from 10 to 30 mol % of repeat units 13b) from 15 to 30 mol % of repeat units 13c) a molar amount corresponding to the sum of 13b) plus 13c) minus 13a) of repeat units 13d) and repeat units of the formula 13e).

Particular utility is possessed by polyether ester imides composed of from 15 to 25 mol % of repeat units 13a), from 15 to 25 mol % of repeat units 13b), from 20 to 30 mol % of repeat units 13c), a molar amount corresponding to the sum of 13b) plus 13c) minus 13a) of repeat units 13d), in particular those derived from hydroquinone, and repeat units 13e), advantageously in an amount of not less than 10 mol %.

14. Mesomorphic polycondensates composed of 14a) not less than 10 mol %, advantageously not less than 20 mol %, of repeat units derived from p-hydroxybenzoic acid, 14b) from 5 to 30 mol %, advantageously from 10 to 25 mol %, of repeat units derived from methylhydroquinone, 14c) from 0 to 20 mol %, in particular from 2 to 18 mol %, of one or more of the repeat units of the formulae

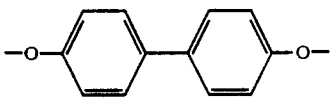

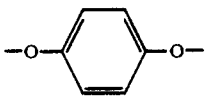

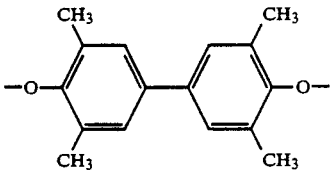

suitable starting compounds being 4,4'-dihydroxybiphenyl, hydroquinone and 3,3',5,5'-tetramethyl4,4,-dihydroxybiphenyl, 14d) from 0 to 20 mol %, advantageously from 2 to 15 mol %, of one or more of the repeat units of the following formulae

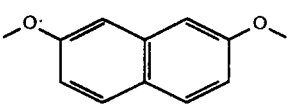

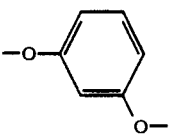

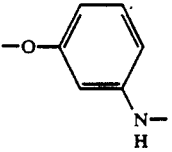

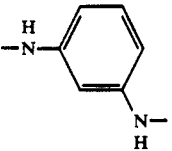

suitable starting compounds being 2,7-dihydroxynaphthalene, resorcinol, m-aminophenol and m-phenylenediamine, 14e) a molar amount corresponding to the sum of components 14b), 14c) and 14d) of repeat units derived from terephthalic acid, the sum of the mole percentages of components 14a), 14b), 14c), 14d) and 14e) always adding up to 100 mol %.

It is also possible for some, for example up to 50%, of the required molar amount of units derived from terephthalic acid to be replaced by repeat units derived from isophthalic acid.

It is further possible to replace some of components 14a), for example up to an amount of 15 mol %, by one or more of the repeat units of the following formulae:

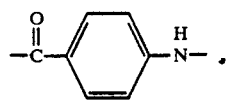

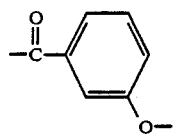

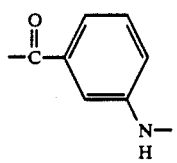

Suitable starting compounds are p-aminobenzoic acid, m-hydroxybenzoic acid and m-aminobenzoic acid.

15. Liquid-crystalline carbamide-containing polycondensates composed of
   15a) aromatic hydroxy- and/or amino-carboxylic acids in which the hydroxyl or amino group is not vicinal to the carboxyl group,
   15b) from 0.1 to 20 mol % of urea,
   15c) aromatic dihydroxy-, diamino- and/or hydroxyamino compounds in which the hydroxyl and amino groups are not vicinal to one another,
   15d) a molar amount equivalent to the sum of components b and c of aromatic dicarboxylic acids in which the carboxyl groups are not in a vicinal arrangement.

Preferred polymers of this type contain 15a) not less than 10 mol % of one or more of the repeat units

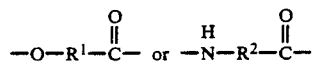

where $R^1$ and $R^2$ can be identical or different and each is 1,4-phenylene, 1,3-phenylene, 2,7-naphthylene or 2,6-naphthylene, 15b) from 0.1 to 20 mol % of repeat units of the formula

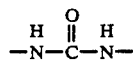

15c) one or more of the repeat units of the formula

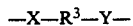

where $R^3$ is 1,4-phenylene, 1,3-phenylene, 2,6-naphthylene, 2,7-naphthylene, 4,4,-biphenylene, 3,4'-biphenylene or 2,6-anthraquinoylene, which radicals may also have halogen atoms, alkyls of from 1 to 4 carbon atoms or phenyl as substituents, and in addition $R^3$ can also be the radical

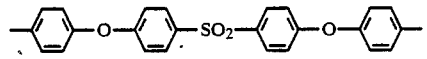

and X and Y can be identical or different and each is oxygen or —NH—, 15d) an amount equivalent to the sum of components 15b) and 15c) of repeat units of the formula

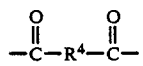

where $R^4$ is 1,4-phenylene, 1,3-phenylene or a radical of one of the following formulae:

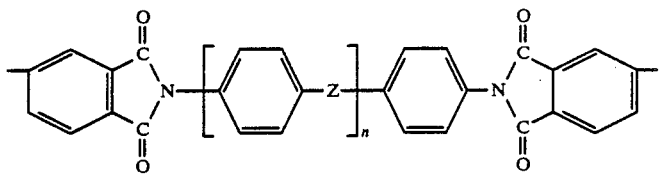

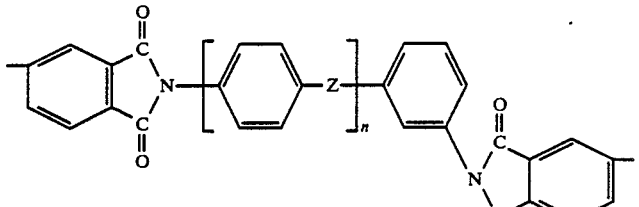

where Z is separately —O—, —S—, —SO$_2$—, —CO—, —CH$_2$— or =C(CH$_3$)$_2$ and n is 0 or 1, or R can also be a radical of one of the formulae

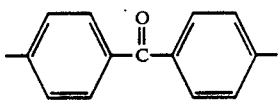

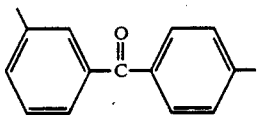
and

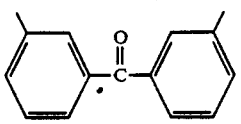

Preferred polycondensates of this type are for example

15/1. wholly aromatic mesomorphic polyether ester carbamides composed of
- 15a) not less than 10 mol % of 4-hydroxybenzoic acid
- 15b) from 0.5 to 12 mol % of urea
- 15c₁) from 3 to 20 mol % of hydroquinone and/or 4,4'-dihydroxybiphenyl
- 15c₂) from 5 to 30 mol % of 4,4,-di(p-hydroxyphenoxy)diphenyl sulfone and
- 15d) a molar amount equivalent to the sum of components 15b) and 15c) of terephthalic acid.

15/2. Polyester carbamides composed of
- 15a) not less than 10 mol % of 4-hydroxybenzoic acid
- 15b) from 0.1 to 11 mol % of urea
- 15c₁) from 10 to 25 mol % of 3,3',5,5'-tetramethyl-4,4,-dihydroxybiphenyl
- 15c₂) from 5 to 15 mol % of hydroquinone
- 15c₃) from 5 to 15 mol % of 4,4,-dihydroxybiphenyl and
- 15d) a molar amount of terephthalic acid corresponding to the sum of components 15b) and 15c).

15/3. Polyester carbamides composed of
- 15a) not less than 10 mol % of 4-hydroxybenzoic acid
- 15b) from 0.1 to 7 mol % of urea
- 15c₁) from 5 to 35 mol % of tert.-butylhydroquinone
- 15c₂) from 2 to 30 mol % of 4,4,-dihydroxybiphenyl and
- 15d) a molar amount of terephthalic acid corresponding to the sum of 15b) and 15c).

15/4. Polyester amide carbamides composed of
- 15a) not less than 10 mol % of 4-hydroxybenzoic acid which may be partly replaced by 4-aminobenzoic acid
- 15b) from 0.4 to 10 mol % of urea
- 15c₁) from 3 to 30 mol % of tert.-butylhydroquinone
- 15c₂) from 3 to 30 mol % of 3-aminophenol
- 15c₃) from 2 to 25 mol % of one or more of the compounds hydroquinone, 4,4'-dihydroxybiphenyl and resorcinol and
- 15d) a molar amount corresponding to the sum of components 15b) and 15c) of terephthalic acid, which may be partly replaced by isophthalic acid.

15/5. Polyester amide carbamides composed of
- 15a) not less than 10 mol % of 4-hydroxybenzoic acid and an optional 5-25 mol % of 3-hydroxybenzoic acid
- 15b) from 0.1 to 7 mol % of urea
- 15c₁) from 3 to 30 mol % of 3-aminophenol
- 15c₂) from 3 to 25 mol % of one or more of the compounds hydroquinone, 4,4,-dihydroxybiphenyl and resorcinol and
- 15d) a molar amount corresponding to the sum of components 15b) and 15c) of terephthalic acid and/or isophthalic acid.

15/6. Polyether ester carbamides composed of
- 15a) not less than 10 mol % of 4-hydroxybenzoic acid
- 15b) from 0.1 to 7 mol % of urea
- 15c₁) from 5 to 20 mol % of 4,4,-di(p-hydroxyphenoxy) diphenyl sulfone
- 15c₂) from 10 to 30 mol % of tert.-butylhydroquinone and
- 15d) a molar amount of terephthalic acid equivalent to the sum of components 15b) and 15c).

15/7. Polyether ester imide carbamides composed of
- 15a) not less than 10 mol % of 4-hydroxybenzoic acid
- 15 b) from 0.1 to 5 mol % of urea
- 15c₁) from 5 to 35 mol % of 4,4'-di(p-hydroxyphenoxy)diphenyl sulfone
- 15c₂) a molar amount of hydroquinone and/or 4,4'-dihydroxybiphenyl corresponding to the sum of components $(d_1+d_2)-(c_1+b)$ and
- 15d₁) from 5 to 35 mol % of 4,4,-bis[(4-carboxy)-N-phthalimido]-diphenyl ether, -diphenylmethane, -diphenyl sulfone, -diphenyl sulfide, -diphenyl ketone or -diphenylmethane and
- 15d₂) from 15 to 30 mol % of terephthalic acid.

15/8. Polyester carbamides composed of
- 15a) not less than 20 mol % of 4-hydroxybenzoic acid
- 15b) from 1 to 10 mol % of urea
- 15c₁) from 5 to 15 mol % of tert.-butylhydroquinone
- 15c₂) from 5 to 15 mol % of 4,4'-dihydroxybiphenyl and
- 15d) a molar amount of terephthalic acid corresponding to the sum of components 15b) and 15c). It is of course the case that in each of the above polycondensates the components add up to 100 mol %.

16. Wholly aromatic mesomorphic polyesters which form below 300° C. a liquid-crystalline fiber-forming melt, composed essentially of 16a) from 5 to 25 mol % of repeat units of the formula

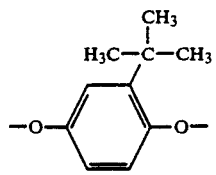

16b) from 5 to 25 mol % of repeat units of the formula

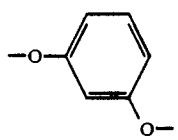

16c) from 10 to 50 mol % of repeat units of the formula

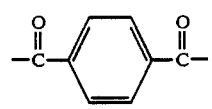

16d) not less than 10 mol % of repeat units of the formula

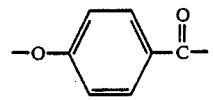

the sum of the molar fractions of components 16a), 16b), 16c) and 16d) always being 100 mol % and the molar ratio of components 16a) and 16b) : component 16c) being within the range from 0.9:1 to 1.1:1.

Suitable starting compounds for the various units are t-butylhydroquinone, resorcinol, terephthalic acid and p-hydroxybenzoic acid.

17. Thermotropically mesomorphic polyesters composed of 17a) not less than 10 mol % of units derived from p-hydroxybenzoic acid, 17 b) from 1 to 25 mol % of repeat units of the formula

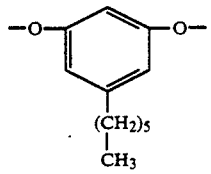

17c) from 5 to 20 mol % of one or more of the repeat units of the following formulae:

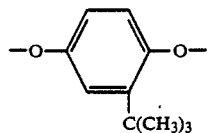

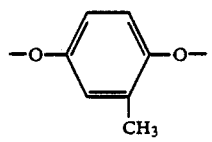

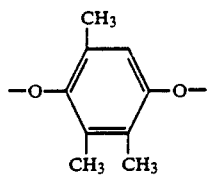

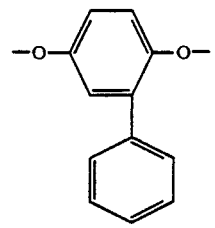

17d) from 5 to 15 mol % of repeat units of the formula

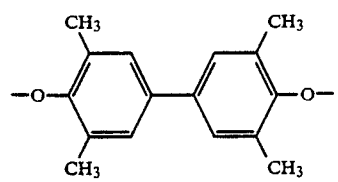

17e) from 10 to 60 mol % of repeat units of the formula

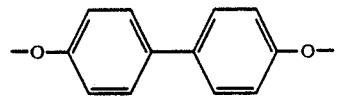

the sum of the molar fractions 17a), 17b), 17c) and 17e) always being 100 mol % and the molar ratio of components 17b)+17c)+17d):component 17e) being within the range from 0.9:1 to 1.1:1. Preferred starting materials are for repeat units of the formula 17b) 3-n-hexylresorcinol
17c) t-butylhydroquinone, methylhydroquinone, trimethylhydroquinone, phenylhydroquinone and 3,3',5,5'-tetramethyl-4,4,-dihydroxybiphenyl
17d) 4,4,-dihydroxybiphenyl
17e) terephthalic acid.

18. Wholly aromatic thermotropically mesomorphic polyesters based on 18a) from 30 to 60 mol % of 4-hydroxybenzoic acid
18b) from 20 to 35 mol % of a mixture of
 b$_1$) terephthalic acid and
 b$_2$) isophthalic acid
  the molar ratio of b$_1$:b$_2$ being within the range from 1.04:1 to 19:1, preferably from 1.5:1 to 10:1, and from 20 to 35 mol % of a mixture of
18c$_1$) hydroquinone
18c$_2$) 4,4'-dihydroxybiphenyl and
18c$_3$) from 0 to 5 mol % of a dihydroxy compound of the general formula

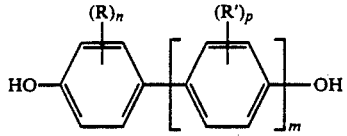

where R and R' are each alkyl of from 1 to 4 carbon atoms, halogen or aryl, n and p are each 1, 2 or 3 and m is 0 or 1, the molar ratio of 18c₁):18c₂) being within the range from 0.1:1 to 2.67:1, preferably from 0.5:1 to 2.33:1, and the molar ratio of 18b):18c) being within the range from 0.9:1 to 1.1:1, preferably from 0.98:1 to 1.02:1.

The sum of components 18a) + 18b) + 18c) is always 100 mol %.

19. Wholly aromatic thermotropically mesomorphic polyesters based on 19a) from 30 to 60 mol % of 4-hydroxybenzoic acid
19b) from 20 to 35 mol % of a mixture of
  19b₁) terephthalic acid and
  19b₂) isophthalic acid
  the molar ratio of 19b₁):19b₂) being within the range from 1.04:1 to 19:1, preferably from 1.5:1 to 1, and
19c) from 20 to 35 mol % of a mixture of
  19c₁) hydroquinone
  19c₂) 4,4'-dihydroxybiphenyl and
  19c₃) from 0.5 to 5 mol % of
    19c₃₁) 2,7-dihydroxynaphthalene and/or
    19c₃₂) 1,3-dihydroxybenzene and/or
    19c₃₃) an aromatic dihydroxy compound of the general formula

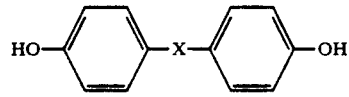

where X is —CH₂—, —C(CH₃)₂, —S—, —SO₂—, —O— or —CO— and the ring-substituted chlorine, bromine, aryl or C₁-C₈-alkyl- or -alkoxy derivatives thereof, and/or 19c₃₄) a compound of the general formula

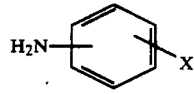

where X is —NH₂ or —OH and the substituents are meta or para to one another, or the ring-substituted chlorine, bromine, aryl or C₁-C₈-alkyl- or -alkoxy derivatives thereof,
the molar ratio of 19c₁):19c₂) being within the range from 0.1:1 to 2.67:1, preferably from 0.5:1 to 2.33:1, and the molar ratio of 19b):19c) being within the range from 0.9:1 to 1.1:1, preferably from 0.98:1 to 1.02:1.

20. Wholly aromatic thermotropically mesomorphic polyesters based on 20a) from 25 to 60 mol % of a mixture of
  20a₁) 4-hydroxybenzoic acid and
  20a₂) 3-hydroxybenzoic acid, 4-aminobenzoic acid and/or 3-aminobenzoic acid and the ring-substituted chlorine, bromine, C₁-C₈-alkyl or C₁-C₈-alkoxy derivatives thereof,
  the molar ratio of 20a₁):20a₂) being within the range from 5:1 to 41:1, preferably from 6:1 to 20:1,
20b) from 20 to 37.5 mol % of a mixture of
  20b₁) terephthalic acid and
  20b₂) isophthalic acid
  the molar ratio of 20b₁):20b₂) being within the range from 1.04:1 to 19:1, preferably from 1.5:1 to 10:1, and
20c) from 20 to 37.5 mol % of a mixture of
  20c₁) hydroquinone
  20c₂) 4,4'-dihydroxybiphenyl
  the molar ratio of 20c₁):20c₂) being within the range from 0.1:1 to 2.67:1, preferably from 0.5:1 to 2.33:1, and the molar ratio of 20b):20c) being within the range from 0.9:1 to 1.1:1, preferably from 0.98:1 to 1.02:1.

21. Wholly aromatic thermotropically mesomorphic polyesters based on 21a) from 30 to 60 mol % of 4-hydroxybenzoic acid
21b) from 20 to 35 mol % of a mixture of
  21b₁) terephthalic acid and
  21b₂) isophthalic acid
  21b₃) from 0.5 to 5 mol % of a dicarboxylic acid of the general formula

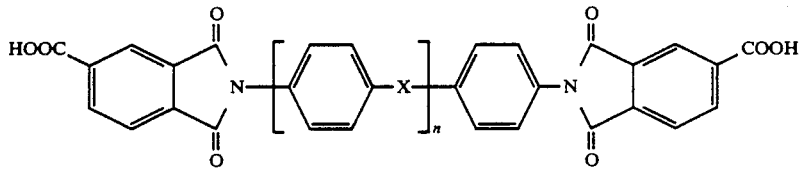

where X is —O—, —S—, —SO₂—, —CO—, —CH₂— or —C(CH₃)₂—, n is 0 or 1 and the two imide nitrogens are meta or para to X, or the ring-substituted C₁-C₈-alkyl, C₁-C₈-alkoxy, aryl, chlorine or bromine derivatives thereof,
the molar ratio of 21b₁):21b₂) being within the range from 1.04:1 to 19:1, preferably from 1.5:1 to 10:1, and
21c) from 20 to 35 mol % of a mixture of
  21c₁) hydroquinone
  21c₂) 4,4'-dihydroxybiphenyl
  the molar ratio of 21c₁):21c₂) being within the range from 0.1:1 to 2.67:1, preferably from 0.5:1 to 2.33:1, and the molar ratio of 21b):21c) being within the range from 0.9:1 to 1.1:1, preferably from 0.98:1 to 1.02:1.

Suitable starting compounds 21b₃) are the compounds recited for the polymers of the above-described type 9 under unit 9a).

22. Thermotropically mesomorphic wholly aromatic polyesters based on 22a) from 30 to 60 mol % of 4-hydroxybenzoic acid,
22b) from 20 to 35 mol % of terephthalic acid and
22c) from 20 to 35 mol % of a mixture of
  22c₁) trimethylhydroquinone and
  22c₂) resorcinol
  in a molar ratio of 22c₁):22c₂) of from 0.4:1 to 0.7:1, preferably from 0.45:1 to 0.65:1, and the molar ratio of 22b):22c) being within the range from 0.9:1 to 1.1:1, preferably from 0.98:1 to 1.02:1.

It is also possible to use mixtures of different thermotropic polymers or else blends of thermotropic polymers and other thermoplastic polymers.

23. Wholly aromatic thermotropically mesomorphic polyesters based on
- 23a) from 3 to 15 mol % of units derived from hydroquinone,
- 23b) from 5 to 35 mol % of units, in particular from 25 to 35 mol %, derived from 2,7-dihydroxynaphthalene,
- 23c) a molar amount equivalent to the sum of 23a) and 23b) of units derived from terephthalic acid and
- 23d) from 10 to 70 mol %, in particular from 10 to 39.4 mol %, of units derived from p-hydroxybenzoic acid.

Some of the lower molecular weight units 23a) and 23b) may have been replaced by one or more units derived from
- 23e) 4,4'-dihydroxybiphenyl and/or
- 23f) 4,4'-dihydroxydiphenyl sulfone and/or
- 23g) 2,2-di(4-hydroxyphenyl)propane.

Advantageously, the level of repeat units 23e), 23f) and/or 23g) is from 2 to 20 mol %. Particular preference is given to polyesters if the level of repeat units 23b) and of one or more of repeat units 23e), 23f) and/or 23g) is from 25 to 40 mol %.

24. Wholly aromatic thermotropically mesomorphic polyesters composed of
- 24a) from 10 to 90 mol % of repeat units of the formula

a suitable starting compound being for example 2-hydroxy-6-carboxynaphthalene,
- 24b) from 10 to 90 mol % of repeat units of the formula

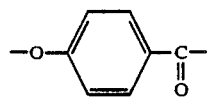

a suitable starting compound being for example p-hydroxybenzoic acid.

Advantageously, such wholly aromatic polyesters contain the repeat units 24a) in an amount of from 65 to 85 mol %, particularly preferably in amounts of from 70 to 80 mol %.

25. Wholly aromatic thermotropically mesomorphic polyesters composed of
- 25a) from 31 to 70 mol %, in particular from 40 to 60 mol % of repeat units of the formula

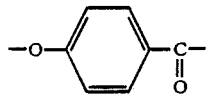

a suitable starting compound being for example p-hydroxybenzoic acid.

- 25b) from 20 to 30 mol % of repeat units of the formula

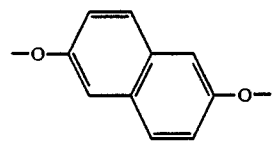

a suitable starting compound being for example 2,6-dihydroxynaphthalene.
- 25c) from 20 to 30 mol % of repeat units of the formula

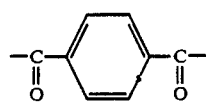

a suitable starting compound being for example terephthalic acid.

It is of course the case that the aromatic rings of the repeat units may also have alkyl or alkoxy radicals of from 1 to 4 carbon atoms, halogen atoms, phenyl radicals or combinations thereof as substituents.

26. Thermotropically mesomorphic polyesters composed of
- 26a) from 20 to 60 mol %, in particular from 35 to 45 mol %, of repeat units of the formula

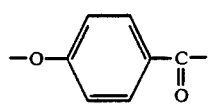

a suitable starting compound being for example p-hydroxybenzoic acid.
- 26b) from 5 to 18 mol % of repeat units of the formula

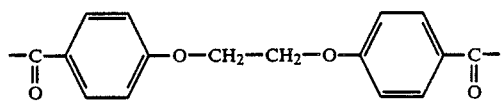

a suitable starting compound being for example 1,2-di(4-carboxyphenoxy)ethane.
- 26c) from 5 to 35 mol % of repeat units of the formula

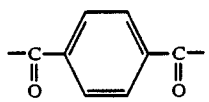

a suitable starting compound being for example terephthalic acid.
- 26d) from 20 to 40 mol % of repeat units of the formula

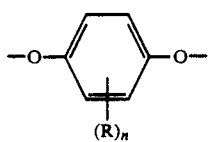

where R is methyl, chlorine, bromine or a combination thereof and n is 1, 2 or 3.

Preferred polyesters contain from 35 to 45 mol % of repeat units 26a), from 10 to 15 mol % of repeat units 26b), from 15 to 25 mol % of repeat units 26c), from 25 to 35 mol % of repeat units 26d).

It is of course the case that the sum of components 26b) and 26c) is equimolar to the amount of components 26d).

Furthermore, the aromatic rings of components 26a), 26b) and 26c) may also be substituted by alkyl or alkoxy each of 1 to 4 carbon atoms, halogen, phenyl or combinations thereof.

27. Thermotropically mesomorphic polyesters composed of 27a) from 20 to 60 mol %, in particular from 35 to 45 mol %, of repeat units of the formula

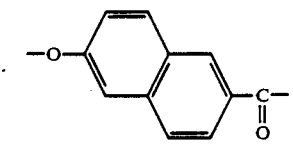

a suitable starting compound being for example 2-hydroxy-6-naphthalenecarboxylic acid, 27b) from 10 to 50 mol %, in particular from 25 to 40 mol %, of repeat units of the formula

a suitable starting compound being for example p-hydroxybenzoic acid.

27c) from 5 to 30 mol %, in particular from 15 to 25 mol %, of repeat units of the formula

—O—R'—O— where R, is a divalent radical having one or more phenyl rings, 27d) from 5 to 30 mol %, in particular from 15 to 25 mol %, of repeat units of the formula

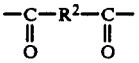

where $R^2$ is a divalent radical having one or more phenyl rings.

A preferred starting compound for 27c) is for example hydroquinone and for 27d) for example terephthalic acid.

It is of course the case that the repeat units may also have alkyl or alkoxy radicals having from 1 to 4 carbon atoms, halogen atoms, phenyl radicals or combinations thereof as substituents.

28. Thermotropically mesomorphic polyesters composed of 28a) from 10 to 90 mol %, in particular from 10 to 40 mol %, of repeat units of the formula

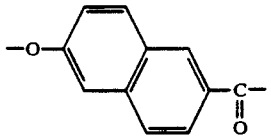

a suitable starting compound being for example p-hydroxy-6-naphthalenecarboxylic acid, 28b) from 5 to 45 mol %, in particular from 10 to 40 mol %, of repeat units of the formula

—O—R'—O— where R' is a divalent radical having one or more phenyl rings, a preferred starting compound being for example hydroquinone, 28c) from 5 to 45 mol %, in particular from 10 to 40 mol %, of repeat units of the formula

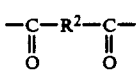

where $R^2$ is a divalent radical having one or more phenyl rings, a preferred starting compound being for example terephthalic acid.

Other preferred polyesters contain from 60 to 80 mol % of units 28a), from 10 to 20 mol % of 28b) and from 10 to 20 mol % of units 28c).

It is of course the case that the aromatic rings of repeat units may also have alkyl or alkoxy radicals of from 1 to 4 carbon atoms, halogen atoms, phenyl radicals or combinations thereof as substituents.

29. Thermotropically mesomorphic polyester amides composed of 29a) from 10 to 90 mol % of repeat units of the formula

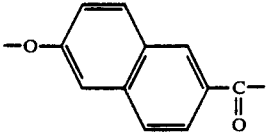

a suitable starting compound being for example 2-hydroxy-6-naphthalenecarboxylic acid, 29b) from 5 to 45 mol % of repeat units of the formula

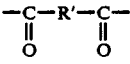

where R' is a divalent radical comprising one or more phenyl rings or is a divalent trans-cyclohexane ring, a preferred starting compound being for example terephthalic acid, 29c) from 5 to 45 mol % of repeat units of the formula

—Y—$R^2$—Z— where $R^2$ is a divalent radical comprising one or more phenyl rings, Y is —O—, —NH— or —$NR^3$—, and Z is —NH— or —$NR^3$—, $R^3$ being alkyl of 1 to 6 carbon atoms or phenyl; preferred starting compounds 29c) are for example 4-aminophenol and p-phenylenediamine;

29d) from 0 to 40 mol % of repeat units of the formula

—O—$R^4$—O— where $R^4$ is a divalent radical comprising one or more phenyl rings, a preferred starting compound being for example hydroquinone.

It is of course the case that the aromatic rings of the repeat units may also have alkyl or alkoxy radicals of from 1 to 4 carbon atoms, halogen atoms, phenyl radicals or combinations thereof as substituents.

The polycondensates prepared by the process according to the invention are suitable for producing filaments, fibers, films, moldings and surface coatings.

The process according to the invention is illustrated by the following Example:

EXAMPLE

Stage 1

In a stirred kettle equipped with a column, 90 mol of terephthalic acid, 117 mol of 4-hydroxybenzoic acid, 31.5 mol of hydroquinone, 18 mol of 4,4'-dihydroxybiphenyl, 40.5 mol of 2,7-dihydroxynaphthalene and 42.2 kg of acetic anhydride are raised under atmospheric pressure from 140° to 260° C. in the course of 3 hours, during which 33 kg of a mixture of acetic acid and acetic anhydride are distilled off through the column. The level of starting materials in the condensed vapor is less than 0.1% by weight. In the course of 3 hours the initial suspension turns into a homogeneous melt having an inherent viscosity of 0.21 dl/g, measured as a 0.5% strength by weight solution in 4-chlorophenol at 60° C.

Stage 2

The oligomer mixture from stage 1 is metered continuously at a rate of 3 kg per hour under a pressure of 6 bar in at the top of a precondensation zone, 30 mm in diameter and 4000 mm in length, packed with Raschig rings and having a free surface area of 1.2 m²/l in the top third and 0.6 m²/l in the two bottom thirds, and passes at 330° C. under a pressure decreasing to 8 mbar through the precondensation zone in the course of a residence time of 7 minutes to form vaporous acetic acid and a precondensate.

Stage 3

In a separating vessel connected to the precondensation zone, which will serve as the condensation zone in stage 4, the prepolymer, which has an inherent viscosity of 0.4 dl/g, separates from the vaporous acetic acid, which is drawn off.

Stage 4

The prepolymer separated from the vaporous acetic acid collects in the separating vessel and is condensed at 310° C. under a pressure of 8 mbar in the course of a residence time of 35 minutes, and the condensate is discharged via a gear pump, extruded, consolidated and granulated. The inherent viscosity of the polymer is 0.65 dl/g. The polycondensate obtained has a glass transition temperature of 125° C.

Postcondensation

The polycondensate obtained in stage 4 is transferred as a liquid melt into an extruder having a devolatilizing means and is postcondensed at 300° C. under a pressure of 3 mbar in the course of an average residence time of 0.75 hours. The highly polymeric condensate thus obtained has an inherent viscosity of 2.2 dl/g.

We claim:

1. A process for preparing an aromatic polycondensate formed from
   a) an aromatic hydroxy-, thio- or amino-carboxylic acid where the hydroxyl, thio or amino group is not vicinal to the carboxyl group,
   b) an aromatic dihydroxy-, dithio-, diamino- or hydroxy-amino compound in which the hydroxyl, thio and amino groups are not vicinal to one another and which may have been replaced to an extent of up to 30 mol % by an alkanediamine of from 4 to 10 carbon atoms or a cycloalkanediamine of from 5 to 8 carbon atoms,
   c) urea as an optional component and
   d) a molar amount equivalent to the sum of components b) and c) of an aromatic dicarboxylic acid in which the carboxyl groups are not in a vicinal arrangement and which may have been replaced to an extent of up to 30 mol % by an alkanedicarboxylic acid of from 6 to 12 carbon atoms or a cycloalkanedicarboxylic acid of from 7 to 10 carbon atoms, comprising the following steps:
   1) reacting components a), b), d) and optionally c) with a lower fatty acid anhydride in a molar excess, based on the hydroxyl, thio and amino groups, at from 140° to 280° C. with distillative removal of fatty acid formed and excess fatty acid anhydride to form an oligomer mixture,
   2) passing the oligomer mixture from stage 1 downward through an essentially perpendicular tubular precondensation zone having a free surface area of from 0.3 to 1.5 m²/l with a residence time of from 3 to 30 minutes under a pressure of from 0.5 to 100 mbar at from 250° to 370° C. to form a two-phase mixture of prepolymer and vaporous fatty acid,
   3) separating the prepolymer from the vaporous fatty acid and
   4) condensing the prepolymer in a condensation zone in the course of a residence time of from 10 to 60 minutes at from 250° to 360° C. under a pressure of from 0.5 to 100 mbar to give a granulable polycondensate.

2. A process as defined in claim 1, wherein the precondensation zone has in the top third an inner surface area of from 1.1 to 1.4 m²/l and in the remaining two thirds an inner surface, area of from 0.5 .to 0.8 m²/l.

3. A process as defined in claim 1, wherein a residence time of from 5 to 20 minutes is maintained in stage 2.

4. A process as defined in claim 1, wherein the condensation in the precondensation zone is carried to an inherent viscosity of from 0.2 to 0.5.

5. A process as defined in claim 1, wherein a residence time of from 15 to 45 minutes is maintained in stage 4.

6. A process as defined in claim 1, wherein the condensation in stage 4 is carried to an inherent viscosity of from 0.3 to 1.

7. A process as defined in claim 1, wherein after stage 4 a partly crystalline polycondensate is further condensed in solid form at from 10° to 80° C. below the melting point of the polycondensate in the solid phase in an inert gas atmosphere or under reduced pressure.

8. A process as defined in claim 1, wherein following stage 4 an amorphous polycondensate is further condensed as a liquid melt under reduced pressure with constant formation of new surfaces.

* * * * *